United States Patent [19]

Ishiguro et al.

[11] 4,161,764
[45] Jul. 17, 1979

[54] EXPOSURE CONTROLLING CIRCUIT FOR ELECTRIC SHUTTERS

[75] Inventors: Yasuo Ishiguro; Kenji Wakazono; Toshihisa Saito, all of Tokyo, Japan

[73] Assignee: Copal Company Limited, Tokyo, Japan

[21] Appl. No.: 903,401

[22] Filed: May 8, 1978

[30] Foreign Application Priority Data

May 10, 1977 [JP] Japan .................... 52-52584

[51] Int. Cl.² ............ G03B 7/00; G03B 9/58
[52] U.S. Cl. .................... 361/187; 354/51; 354/234
[58] Field of Search ............ 361/160, 187, 195, 196; 354/50, 51, 60 R, 60 F, 133, 234, 253

[56] References Cited

U.S. PATENT DOCUMENTS

| 2,978,970 | 4/1961 | Fahlenberg | 354/133 |
|---|---|---|---|
| 3,579,050 | 5/1971 | Basu et al. | 361/187 |
| 4,075,648 | 2/1978 | Inoue et al. | 354/267 |
| 4,099,195 | 7/1978 | Urano et al. | 354/50 |
| 4,115,830 | 9/1978 | Stieber | 361/187 |
| 4,123,766 | 10/1978 | Hasegawa | 354/51 |
| 4,126,877 | 11/1978 | Ohtaki et al. | 354/60 R |

Primary Examiner—Gerald Goldberg
Attorney, Agent, or Firm—Cushman, Darby & Cushman

[57] ABSTRACT

An exposure controlling circuit for electric shutters incorporating therein a voltage drop detecting circuit which will issue a signal for passing a current to a coil for closing a shutter when a current source voltage becomes lower than a predetermined voltage in order to prevent the shutter closing motion from being made unable to be made by the drop of the current source voltage after the shutter is opened. This controlling circuit further includes a driving circuit for making an indication within the field of vision of the view finder of a photographic camera when a signal is issued from the voltage drop detecting circuit.

3 Claims, 3 Drawing Figures ered respectively.

EXPOSURE CONTROLLING CIRCUIT FOR ELECTRIC SHUTTERS

BACKGROUND OF THE INVENTION (a) Field of the Invention

This invention relates to an exposure controlling circuit for electric shutters arranged to start a shutter closing motion with passing a current to a coil (such as of an electromagnet, plunger solenoid or motor).

(b) Description of the Prior Art

An electric shutter of a type made to start a shutter closing motion with passing a current to a coil is known, for example, in U.S. Pat. No. 2,978,970. In this kind of electric shutter, a disadvantage will be produced unless the current source voltage is kept at a value necessary to well drive the coil after the shutter is opened and until a signal for closing the shutter is generated. That is to say, if the voltage of the current source voltage drops to be below a value necessary to well drive the coil in the course of the exposing operation, the shutter closing motion will not be made and the shutter will permanently remain open. This means that not only the film frame exposed then but also the film frame to be wound up later will be all spoiled. Such phenomenon may occur in a general exposure or bulb-exposure and will be likely to occur particularly in the case of a long time exposure.

SUMMARY OF THE INVENTION

Therefore, a primary object of the present invention is to provide an exposure controlling circuit for electric shutters wherein a circuit for detecting the voltage drop of a current source battery is incorporated so that, after the shutter is opened and before a proper exposure time elapses, that is, a normal shutter closing signal is generated, when the voltage of the current source battery becomes below a predetermined value, a current may be immediately passed to a coil through the voltage drop detecting circuit to close the shutter in order to eliminate the above mentioned defects.

Another object of the present invention is to provide an exposure controlling circuit for electric shutters including a driving circuit in which, when the shutter is closed by passing a current to a coil through a voltage drop detecting circuit, the fact will be indicated within the field of vision of the view finder of the camera.

These and other objects of the present invention will become more apparent during the course of the following detailed description and appended claims.

DESCRIPTION OF THE PREFERRED EMBODIMENTS

Figure 1:
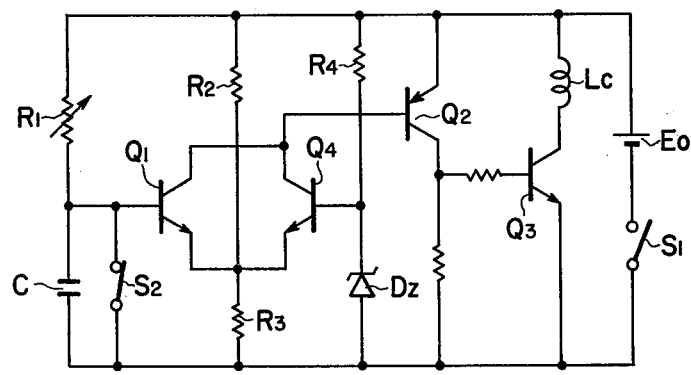
FIG. 1 is a wiring diagram of an embodiment of a circuit according to the present invention.

First of all, in FIG. 1, symbol $E_0$ indicates a current source battery, $S_1$ indicates a current source switch, C and $R_1$ indicate respectively a capacitor and variable resistor forming a delay circuit for controlling the exposure time and $S_2$ indicates a normally closed switch for starting the operation of the delay circuit and opened in association with the operation of opening the shutter to be mechanically released. Symbols $R_2$ and $R_3$ indicate resistors which are also a reference voltage dividing circuit for controlling the exposure time and comparative voltage dividing circuits for detecting the voltage drop, $Q_1$ indicates a switching transistor, $Q_2$ indicates an amplifying transistor, $L_c$ indicates a coil for controlling the closing of the shutter, $Q_3$ incicates a driving transistor, $R_4$ and $D_z$ indicate respectively a resistor and Zener diode forming a reference voltage dividing circuit for detecting the voltage drop and $Q_4$ indicates a switching transistor.

The operation of the above mentioned circuit shall be explained in the following.

In photographing, when a releasing operation is made, first the current source of switch $S_1$ will be closed and then the shutter will be opened. When the shutter is opened, the switch $S_2$ will be opened in association with it and the capacitor C will begin to be charged through the variable resistor $R_1$. With the rise of the voltage between the terminals of the capacitor C, when a predetermined time (proper exposure time) elapses, the transistors $Q_1$, $Q_2$ and $Q_3$ will be rendered all conductive and a current will flow to the coil $L_c$ to close the shutter. Here, in the course of the above mentioned exposure controlling operation, when the voltage of the current source battery drops due to the consumption, the potential at the connecting point of the resistors $R_2$ and $R_3$ will also gradually drop. Thus, when the emitter potential becomes lower than the basic potential given by the Zener diode $D_z$ of the transistor $Q_4$ ($V_{BE}$ of the transistor $Q_4$ shall be neglected for convenience sake), the transistor $Q_4$ will be rendered conductive to make the transistors $Q_2$ and $Q_3$ conductive to close the shutter in the same manner as is described above. Therefore, the shutter will be always closed.

Figure 2:
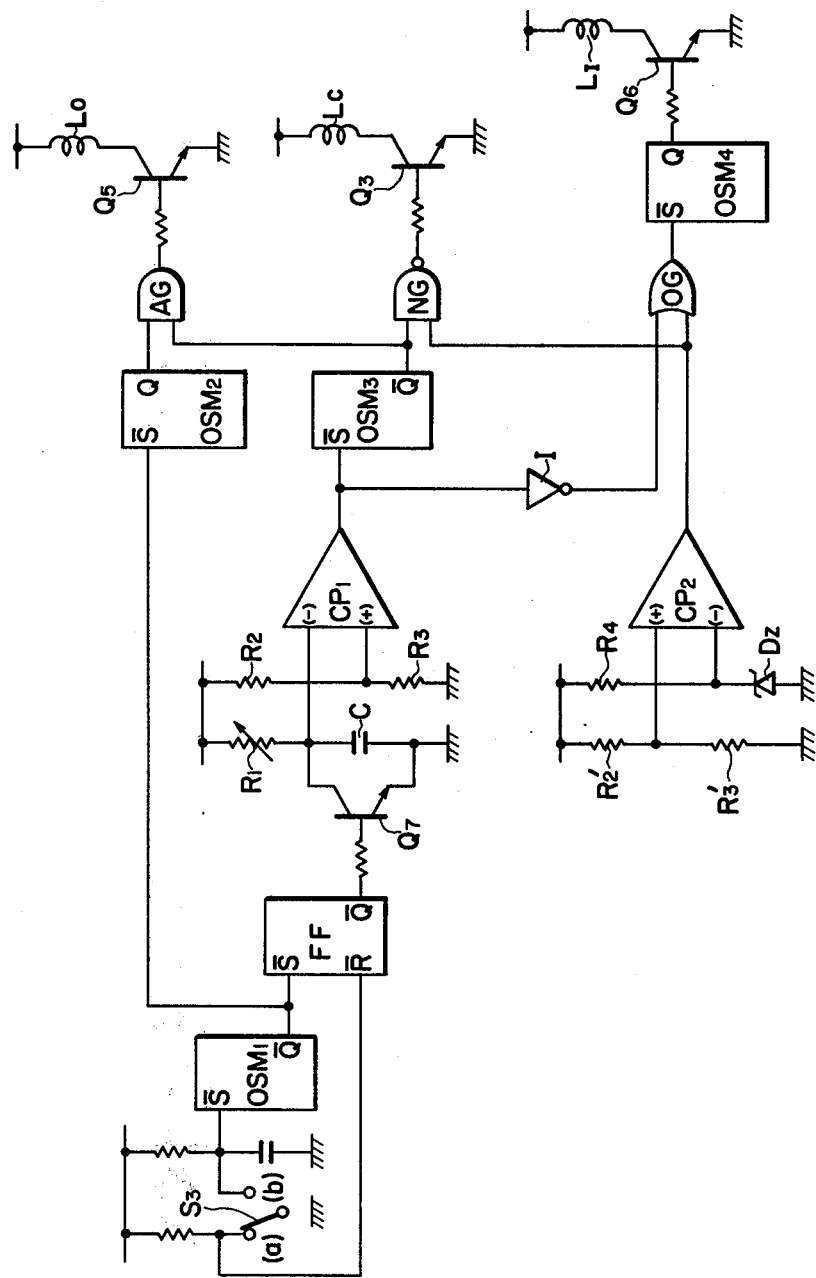
FIG. 2 is an illustrative wiring diagram showing another embodiment of a circuit according to the present invention.

The embodiment of FIG. 1 shows a controlling circuit adapted to an electric shutter of a type opened by the shutter release through a mechanical means. Now, a controlling circuit adapted to an electric shutter of a type opened by the shutter release through an electromagnetic means shall be explained. In FIG. 2, symbol $S_3$ indicates a switch for the shutter release operated after a current source switch not illustrated is closed in a release button pressing stroke. Symbols $OSM_1$ to $OSM_4$ indicate one-shot multivibrator circuits, FF indicates a flip-flop circuit, $CP_1$ indicates a comparator circuit for controlling the exposure time, $CP_2$ indicates a comparator circuit for detecting the voltage drop, $R_2'$ and $R_3'$ indicate resistors forming the same comparative voltage dividing circuit for detecting the voltage drop as of resistors $R_2$ and $R_3$, respectively. I indicates an inverter circuit, AG indicates an AND-gate circuit, NG indicates a NAND-gate circuit, OG indicates an OR-gate circuit, $Q_5$ to $Q_7$ indicate transistors, $L_0$ indicates a coil for controlling the opening of the shutter and $L_1$ indicates a coil for controlling the indication.

The operation of the above mentioned circuit shall be explained in the following.

In photographing, when a releasing operation is made, first a current source not illustrated will be connected to the entire circuit and, in the flip-flop circuit FF, the reset terminal $\bar{R}$ will be placed on an "L" level, the output $\bar{Q}$ will be made to be on an "H" level and the transistor $Q_7$ will be rendered conductive. In this initial state, the outputs of the comparator circuits $CP_1$ and $CP_2$ will be both on the "H" level, the output $\bar{Q}$ of one-shot multivibrator circuit $OSM_1$ will be on the "H"

level, the output Q of the one-shot multivibrator circuit OSM$_2$ will be on the "L" level, the output $\bar{Q}$ of the one-shot multivibrator circuit OSM$_3$ will be on the "H" level, the outputs of the AND-gate circuit AG and NAND-gate circuit NG will be both on the "L" level, the output of the OR-gate circuit OG will be on the "H" level and the output of the one-shot multivibrator circuit OSM$_4$ will be on the "L" level. When the switch S$_3$ is switched from the terminal (a) to the terminal (b) with the progress of the releasing operation, in the flip-flop circuit FF, the reset signal will be removed but, on the other hand, in the one-shot multivibrator circuit OSM$_1$, the pulse of the "L" level will be given to the set terminal $\bar{S}$ to set the circuit and the output $\bar{Q}$ will turn to the "L" level for a predetermined short time. Thereby, the one-shot multivibrator circuit OSM$_2$ will be set and the output Q will turn to the "H" level for a predetermined short time. Therefore, in the AND-gate AG, both inputs will be on the "H" level to open the gate and the output will turn to the "H" level for the above mentioned predetermined time. As a result, the transistor Q$_5$ will be rendered conductive and a current will flow to the coil L$_0$. By its exciting operation, the shutter will be opened. On the other hand, the flip-flop circuit FF will be also set, the output $\bar{Q}$ will turn to the "L" level to render non-conductive the transistor Q$_7$. Therefore, the capacitor C will begin to be charged through the variable resistor R$_1$. When the potential of the turning input terminal (−) becomes higher than the reference voltage of the non-turning input terminal (+) determined by the resistors R$_2$ and R$_3$, the comparator circuit CP$_1$ will turn so that the output may be on the "L" level. As a result, the one-shot multivibrator circuit OSM$_3$ will be set and the output $\bar{Q}$ will turn to the "L" level for a predetermined short time. Therefore, in the NAND-gate circuit NG, the gate will be opened and the output will turn to the "H" level for the above mentioned predetermined time. Thereby, the transistor Q$_3$ will be rendered conductive and a current will flow to the coil L$_c$. By its exciting action, the shutter will be closed. In this operation, by the turning of the comparator circuit CP$_1$, in the OR-gate circuit OG, one input will be placed on the "L" level through the inverter circuit I and therefore the gate will be kept open. Further, the exciting time of the coil L$_0$, that is, the time while the AND-gate circuit AG is opened will be regulated at the longest by the turning continuing time of the one-shot multivibrator circuit OSM$_2$ but, before it, the one-shot multivibrator circuit OSM$_3$ will turn and, when its output $\bar{Q}$ becomes "L," in the AND-gate circuit AG, the gate will be closed and the current to the coil L$_0$ will be stopped. Further, in the course of the exposure controlling operation in which the comparator circuit CP$_1$ has not yet turned, if the current source voltage drops, the potential at the connecting point of the resistors R$_2$' and R$_3$' will also gradually drop. As a result, when the potential of the non-turning input terminal (+) of the comparator circuit CP$_2$ becomes lower than the reference voltage given to the Zener diode D$_z$, the comparator circuit CP$_2$ will turn and the output will become the "L" level. As a result, in the NAND-gate NG, the gate will be opened and the output will turn to the "H" level. Therefore, the transistor Q$_3$ will be rendered conductive and a current will flow to the coil L$_c$. By its exciting operation, the shutter will be forcibly closed irrespectively of the exposure time set by the variable resistor R$_1$. On the other hand, by the turning of the comparator circuit CP$_2$, in the OR-gate circuit OG, both inputs will be on the "L" level, therefore the gate will be closed and the output will turn to the "L" level. As a result, the one-shot multivibrator circuit OSM$_4$ will be set and the output Q will be on the "H" level for a predetermined short time. Therefore, the tansistor Q$_6$ will be rendered conductive and a current will flow to the coil L$_1$. In such case, by the exciting operation of the coil L$_1$ and the mechanism shown in FIG. 3, the shutter as forcibly closed will be able to be indicated.

Figure 3:
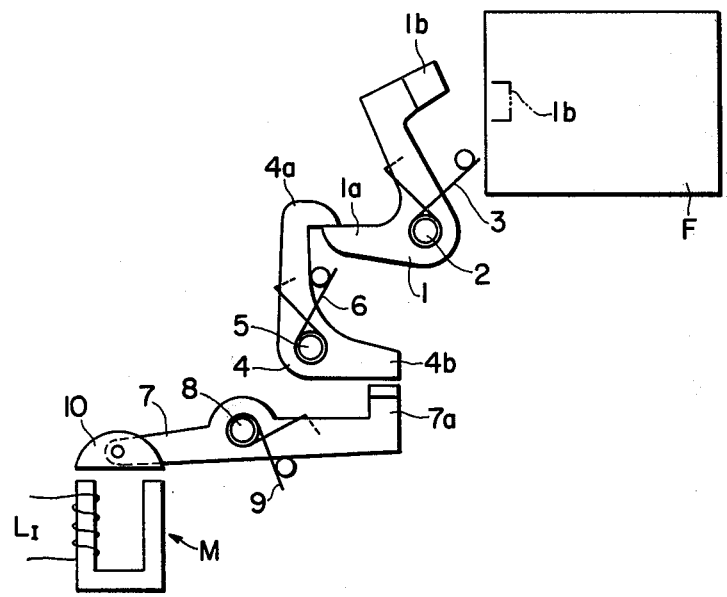
FIG. 3 is an explanatory view showing an example of an indicating mechanism.

In FIG. 3, symbol F indicates a view finder, reference numeral 1 indicates an indicating lever pivoted to a shaft 2, biased clockwise by a spring 3 and having an arm 1a and a flag 1b which can be present within the view finder F. Reference numeral 4 indicates a locking lever pivoted to a shaft 5, biased clockwise by a spring 6 and having a hook 4a engageable with the arm 1a and an arm 4b. Reference numeral 7 indicates an armature lever pivoted to a shaft 8, biased clockwise by a spring 9, having a bend 7a which can push the arm 4b and supporting an armature 10 rotatably on an arm 7b. Symbol M indicates an electromagnet to be energized by the coil L$_1$ so as to be able to attract the armature 10 and counterclockwise rotate the armature lever 7 against the tension of the spring 9.

As described above, when, by the drop of the current source voltage, a current is passed to the coil L$_1$, and the electromagnet M is energized, the armature 10 will be attracted and the armature level 7 will rotate counterclockwise against the tension of the spring 9. As a result, the locking lever 4 will be pushed on the arm 4b by the bend 7a so as to be rotated counterclockwise against the tension of the spring 6 and the hook 4a will be unlocked from the arm 1a. Therefore, the indicating lever 1 will be rotated clockwise by the tension of the spring 3 and the flag 1b will be present within the view finder F. By the entry of this flag 1b into the view finder F, it will be indicated that the shutter closing operation then has been forcibly made by the drop of the current source voltage.

The return, that is, setting of this indicating mechanism to the illustrated state can be also made automatically by re-charging the current source battery. However, fundamentally, the indicating lever 1 may be rotated counterclockwise against the tension of the spring 3 so as to lock the arm 1a with the hook 4a of the locking lever 4.

We claim:

1. An exposure controlling circuit for electric shutters comprising a current source, a current source switch connected to said current source, a first switching means connected to said current source through said current source switch, a first coil connected to said current source through said current source switch and first switching means to control the shutter closing operation, and a voltage drop detecting circuit connected to said first switching means and capable of detecting the voltage drop of said current source, said first switching means being operated by a signal issued from said voltage drop detecting circuit to energize said first coil with said current source and to thereby close the shutter when the voltage of said current source drops to be below a predetermined value while the shutter is opened.

2. An exposure controlling circuit for electric shutters according to claim 1 wherein said exposure controlling circuit further comprises an exposure time controlling circuit connected to said first switching means.

3. An exposure controlling circuit for electric shutters according to claim 1 wherein said exposure controlling circuit further comprises a second switching means connected to said voltage drop detecting circuit, a second coil connected to said current source through said current source switch and second switching means, and an indicating mechanism arranged adjacent to said second coil, and said second switching means is operated by a signal issued from said voltage drop detecting circuit to energize said second coil with said current source and to thereby operate said indicating mechanism when the voltage of said current source drops to be below a predetermined value while the shutter is opened.

* * * * *